4 Sheets—Sheet 1.

E. P. WEYER & H. C. WHITE.
Bee-Hive.

No. 218,097. Patented July 29, 1879.

ATTEST:
Arthur C. Fraser,
George H. Fraser.

INVENTORS:
Edward P. Weyer and
Henry C. White,
By their Attorneys,
Burke, Fraser & Connett

N. PETERS, PHOTO-LITHOGRAPHER, WASHINGTON, D. C.

4 Sheets—Sheet 2.

E. P. WEYER & H. C. WHITE.
Bee-Hive.

No. 218,097. Patented July 29, 1879.

ATTEST:
Arthur C. Fraser.
George H. Fraser.

INVENTORS:
Edward P. Weyer and
Henry C. White.
By their Attorneys,
Burke, Fraser & Connett 4 Sheets—Sheet 3.
E. P. WEYER & H. C. WHITE.
Bee-Hive.
No. 218,097. Patented July 29, 1879.
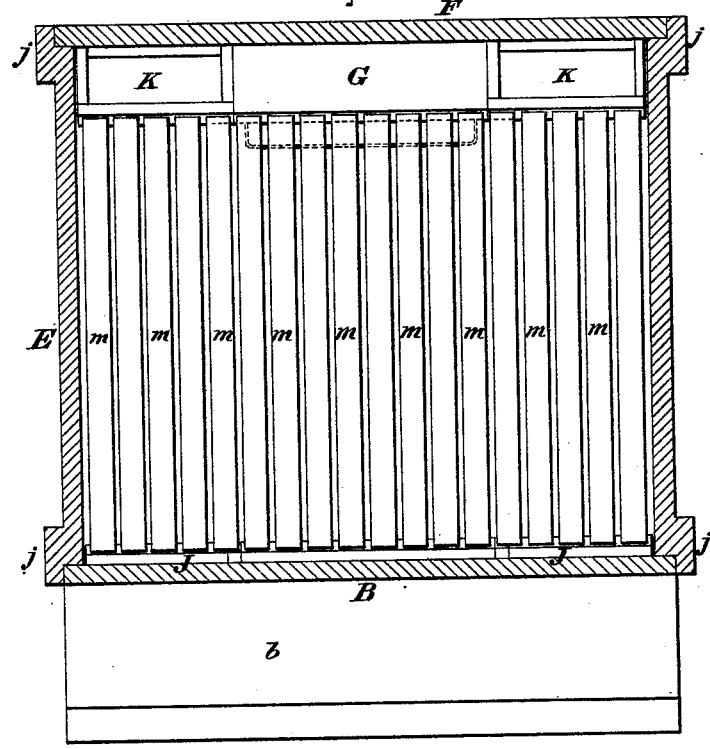
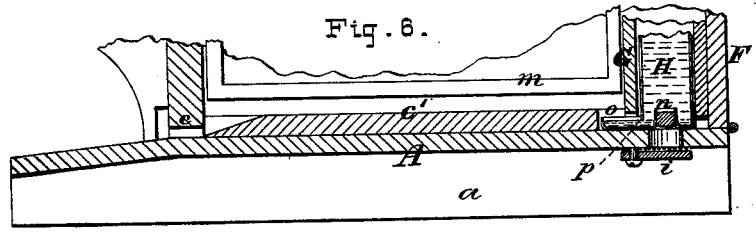
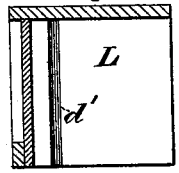
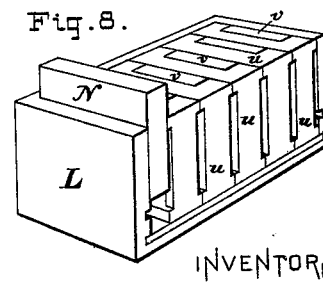
ATTEST:
Arthur C. Fraser.
George H. Fraser.
INVENTORS:
Edward P. Weyer and
Henry C. White.
By their Attorneys,
Burke, Fraser & Connett

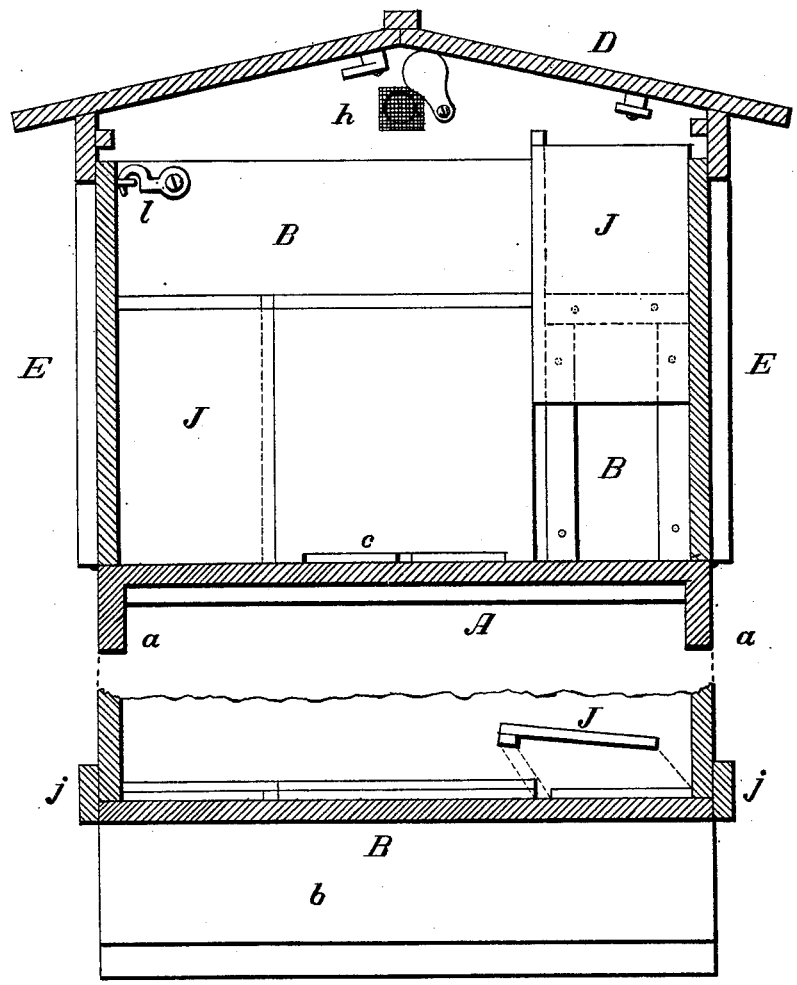

UNITED STATES PATENT OFFICE.

EDWARD P. WEYER AND HENRY C. WHITE, OF MADISON, INDIANA.

IMPROVEMENT IN BEE-HIVES.

Specification forming part of Letters Patent No. 218,097, dated July 29, 1879; application filed March 7, 1879.

*To all whom it may concern:*

Be it known that we, EDWARD P. WEYER and HENRY C. WHITE, both of Madison, in the county of Jefferson and State of Indiana, have invented certain Improvements in Bee-Hives, of which the following is a specification.

Our invention relates to various improvements in a bee-hive adapted for the production of both comb and extracted honey, all as will be more fully hereinafter set forth, and specifically defined in the claims.

Figure 1:
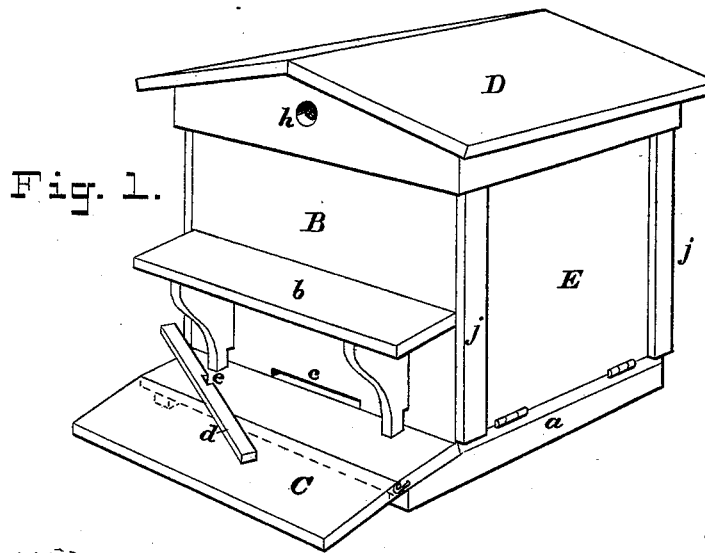
Figure 2:
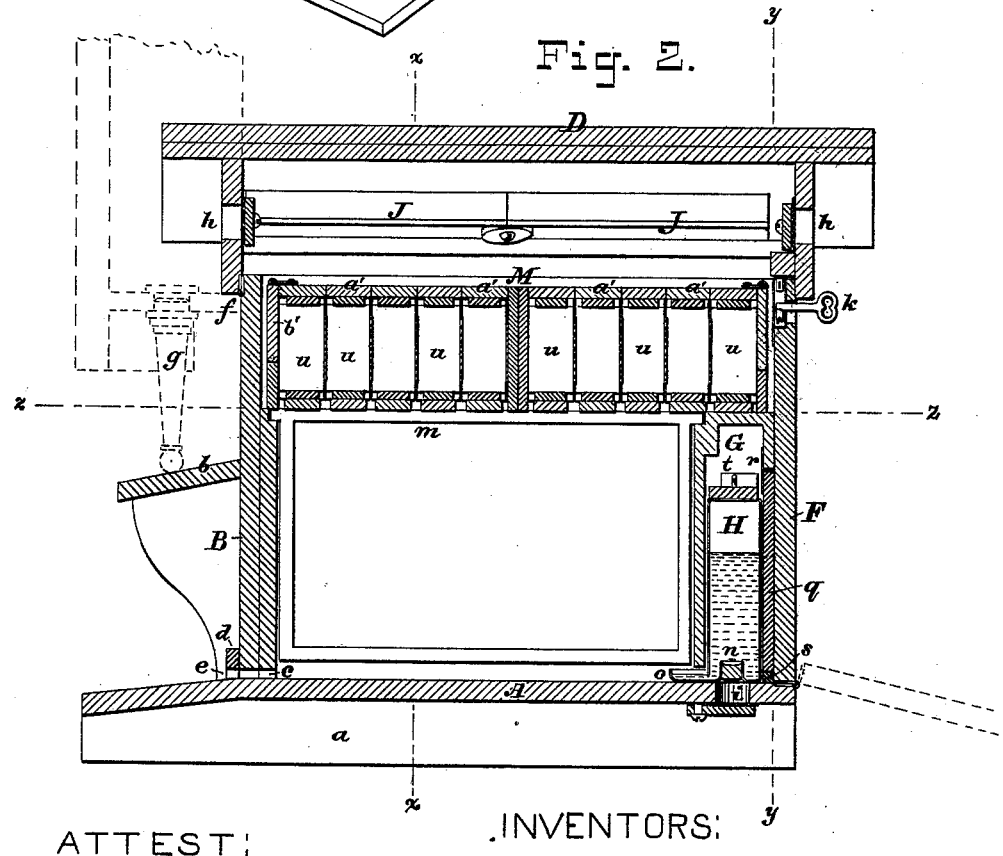
Figure 3:
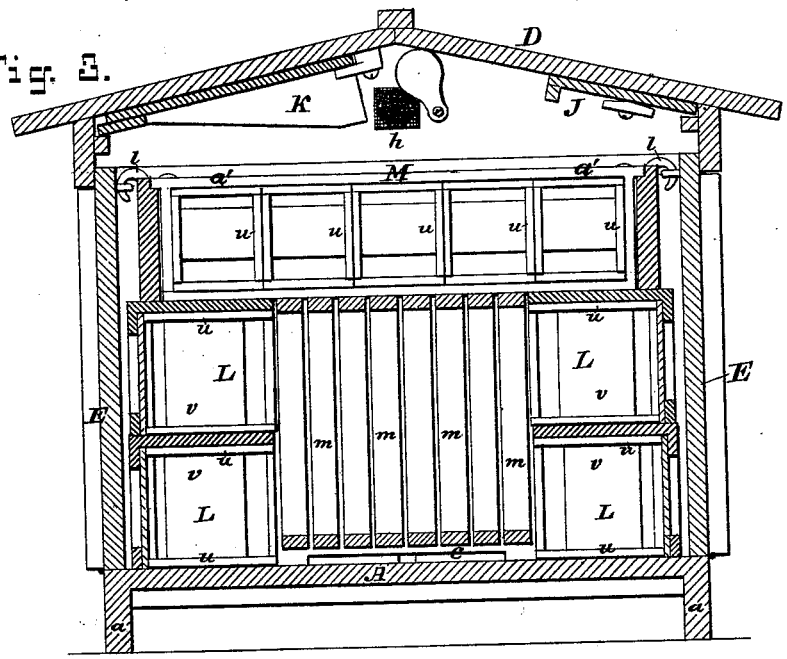
Figure 4:
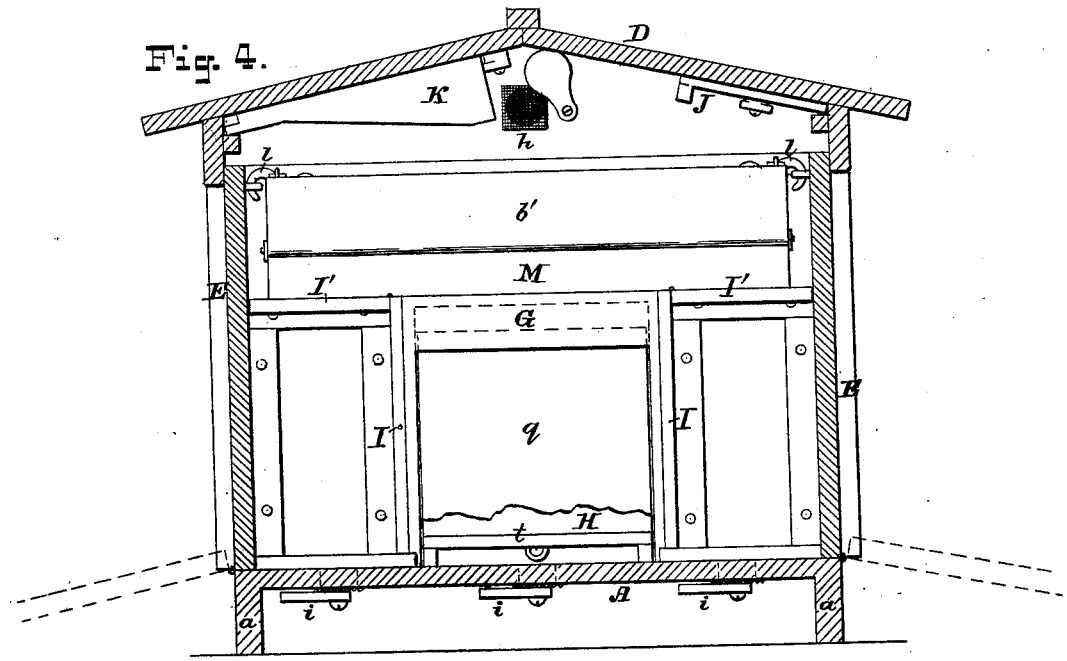

In the drawings, which serve to illustrate our invention, Figure 1 is a perspective view of the outside of the hive. Fig. 2 is a longitudinal vertical mid-section of the same. Fig. 3 is a transverse vertical section taken in the plane of the line $x\,x$, Fig. 2. Fig. 4 is a transverse vertical section taken in the plane of the line $y\,y$, Fig. 2. Fig. 5 is a horizontal section taken in the plane of the line $z\,z$ in Fig. 2, adapted to show the hive when filled with frames for producing extracted honey. Fig. 6 is a sectional view adapted to illustrate the employment of a false bottom when using shallow frames. Fig. 7 is a transverse sectional view of a side section-holder, adapted to illustrate the adjustability of the glass in the front to suit sections of two sizes. Fig. 8 is a perspective view of a side section-holder inverted, showing the manner of securing the sections in place. Fig. 9 is a rear view of the front wall of the hive, showing the rabbet pieces or supports partly in position for supporting the ends of the side frames, and a plan of the same.

The bottom A of the hive is supported upon cleats $a\,a$, which permit a free circulation of air beneath it. To the bottom A is rigidly fixed the front B, to which is attached the portico $b$, for protecting the bee-entrance $c$.

To the porch or platform of the hive is removably attached an alighting-board, C, which serves to extend and increase the area of the porch, and greatly facilitates the entrance of the bees when returning heavily loaded, and as it slopes down to the ground serves to prevent the hive-entrance from becoming obstructed by grass and weeds. As the queen has, or should have, her wings clipped, this board enables her to get back into the hive should she escape during a "swarming fever."

The entrance $c$ is adapted to be closed (or partially closed) by a sliding strip, $d$, arranged to play in keepers formed by gains or slots in the brackets which support the portico $b$. This strip has a notch, $e$, in its upper edge, which, when the strip is inverted, forms a contracted opening for use in winter. In lieu of this notch $e$, the strip may be cut in two at the center, and the contracted opening be formed by leaving more or less space between their ends at the center of the opening $c$.

The top or cover D of the hive is hinged at $f$ to the front B, and turns back, as indicated in dotted lines in Fig. 2. It is supported in this position by a strut or standard, $g$, one end of which fits into a ventilator-opening, $h$, in the pediment of the top D, while the other finds a resting-place on the portico $b$. This arrangement provides a support for the raised cover of the hive without risk of obstructing the entrance $c$.

Two ventilators, $h\,h$, are provided in the pediments of the cover D, one at the front and the other at the back, which are covered with gauze or other foraminous material, to prevent ingress of insects and the egress of bees belonging to the hive. These ventilators are each provided with a slide or wicket, whereby the circulation of air may be regulated or wholly cut off.

Ventilators $i\,i$, similarly provided, are arranged in the bottom of the hive near the back, as indicated in the several figures.

The ventilators $h\,h$ cause a direct circulation of air through the upper part of the hive, under the roof, and over the frames and section-holders.

The sides E E and the back F of the hive are hinged at their lower edges to the bottom A, and turn down, so as to freely expose the interior economy of the hive. This is sufficiently indicated by the dotted lines in Figs. 2 and 4. When these parts are erect in their normal positions, as indicated in the full lines in the drawings, the rabbet-strips $j\,j$ on the sides form recesses to receive the front and back, so as to insure close joints, and the pendent rim of the cover D takes over the upper edges of the front, back, and sides, and secures them all firmly in position.

To prevent the cover from being lifted by unauthorized persons, and the hive rifled of its contents, we provide a lock, k, (shown in Fig. 2,) whereby the cover is securely locked to the back. This lock may be either on the back or the cover.

As an additional or temporary means of securing the sides to the back, we may employ hooks l l. (Best shown in Figs. 3 and 4.)

The central part of the hive forms the brood-chamber, which is represented in Figs. 2 and 4 as containing eight frames, m m. These frames may be of the kind in common use, or of any kind known in the art of bee-keeping. They are suspended at their front ends upon a ledge formed on the inner face of the front B, and at their rear ends upon a similar ledge or rabbeted shoulder formed upon a feeder-holder, G, which is rigidly fixed to the bottom of the hive, and forms the rear end of the brood-chamber.

The holder G is a species of box or housing adapted to receive a feeder or feeding-vessel, H, which is of peculiar construction. It is not attached to the holder, is readily removed therefrom, and may be of any convenient shape.

The body or upper part of the receptacle is air-tight, and it is provided with a stoppered aperture, n, in its bottom, through which it may be filled with honey or sirup for the bees to feed upon. At the bottom of its front is a narrow aperture, p, which opens into a trough, o, attached to the receptacle. The walls of the trough should be a trifle higher than the upper edge of the aperture p, to prevent the contents from overflowing the trough. As the food is taken from the trough by the bees, the air enters the vessel through the aperture p, which permits the contents to descend and keep the trough supplied as long as any food remains. This feeder enables us to supply the bees with extracted honey at exactly the point where it is wanted to complete unfinished sections at the close of the honey season, and it prevents them from taking honey down from the sections. This method of feeding also avoids the depredations of robber-bees, and permits the ready removal of the feeder for filling and its replacement without in the least interfering with or disturbing the operations of the hive.

After the feeder is filled it may be inserted as follows: Let down the back F; then remove the back q of the holder G, which is done by drawing its lower edge out until it drops down low enough to disengage the lip r on its upper edge from the fixed portion of the back of the holder. The strip s, upon which the back q formerly rested, is now removed, and the feeder H pushed into its housing, the trough o passing through an aperture at the lower edge of the front of the holder G until it assumes the position indicated in Fig. 2.

When the feeder is not employed, and it is desired that the aperture in the front of the holder G be closed, we employ a cleated strip, t, (see Figs. 2 and 4,) which is pushed into the said opening as far as the cleats thereon will permit. When not in use this strip may rest upon the feeder H. It is employed for the purpose above named in preparing the hive for winter, and when in place a chaff cushion or pillow may be placed in the feeder-holder in lieu of the feeder in anticipation of severe weather.

In some cases, where ventilation is required through the ventilator i in the bottom of the feeder-holder, we invert the strip t and allow it to rest with the cleats down, as in Fig. 4, whereby it serves to prevent the cushion from obstructing the free passage of air from the ventilator into the brood-chamber.

Arranged to form the sides of the brood-chamber are two removable partitions, I I, which fit into grooves in the rear face of the front B, and are secured by hooks or other equivalent fastenings to the feeder-holder G. These partitions are provided with wings I' I', hinged thereto, and arranged to turn outward, as in Fig. 4, or inward, so as to form a roof or cover to the brood-chamber.

Having described the construction of our hive thus far, we will now describe some part of its operation, so that the remaining details of construction may be the better understood.

In preparing our hive for the winter we first ascertain that our colony is in good condition, with plenty of honey in the eight frames in the brood-chamber, this want having been supplied by means of the feeder. Turn the wings I' I' over the brood-chamber and pack the spaces on each side of the latter with chaff, straw, or other suitable absorbent of moisture to the height of the brood-chamber.

As we may have occasion to open the back of the hive at times it is best to insert pieces of board, stiff paper, or other material between the back F and the packing. Turn out the hinged wings over the packing at the sides, and cover over the brood-chamber and said wings with a chaff cushion or pillow, so as to fill, or nearly fill, the upper portion of the hive.

The ventilators h h may now be opened, or partially opened. The strip d is now put in place over the bee-entrance, with the notch e down, so as to leave a contracted aperture large enough to permit a few bees to pass out and in, but at the same time exclude cold air and mice.

To encourage early activity in the spring, we let down the back F of the hive, remove the packing and strip t from the holder G, fill the feeder H with extracted honey, and put it in place, as shown in Fig. 2, then close up the back again.

As the season advances and the bees begin to gather honey the entrance may be enlarged.

When the bees begin to store honey, if we wish to produce extracted honey, we raise the cover D, remove the chaff cushion on the top and the packing from one side—say the left side—of the brood-chamber, and remove one of the partitions I.

Fastened by means of buttons in the hollow of the cover D are two cleated plates, J J, and two other plates, K K, with broader tapered cleats. These are best shown in Figs. 3, 4, and 5. One of the pieces J is placed against the inner face of the front B, its cleat engaging the groove provided for the partition I, which has been removed. This forms a lateral continuation or extension of the ledge which supports the front ends of the frames $m\ m$; and at the other end, adjacent to the holder G, is placed one of the pieces K, to form a lateral extension for the support of the frames at that end. This makes room for five frames, $m\ m$, on the left side of the brood-chamber, which may be filled with empty comb or comb-foundation. If more space is needed and desired, the other partition I and the packing on the right side of the brood-chamber may be removed, the other plates, J K, put in place, and five more frames set in. Eighteen frames will now be in place, and the hive will present the appearance shown in Fig. 5. These are covered with an ordinary honey-cloth, and free ventilation provided for by opening the ventilators $h\ i$.

By letting down either or both sides E of the hive we provide platforms on which we may shake the bees and brush off the frames as we slide (not lift) them out; and by this hinged attachment of the sides we are enabled to get at the frames far better than from the top. The sides, when let down, also provide plenty of room for the bees to enter in hiving a swarm, and it enables the operator to the better observe when the queen has entered the hive.

By the use of smoke in closing the sides there is no danger of injuring the bees, and the motion of the hinged side is much more steady than where a detached board is employed for closing the hive.

If the hive is to be employed for producing section-box comb honey in the spring, or when the flow of honey seems to require it, we remove the packing from the top of the hive, preferring, for the time, to leave that at the sides of the brood-chamber to retain heat for hatching the young brood.

We now take two side section-holders, L L, filled with sections $u\ u$, provided with empty comb or "foundation-starters," and with tin separators $v$, and place them on the top of the brood-chamber, with their outer or glazed faces on a line with the hinges of the wings I' I'. This leaves a suitable space between their backs for the bees to circulate.

The pieces or plates J J may be slipped down at their ends to prevent "leaking" of the bees between their ends and the ends of the hive.

It will be observed that the section-holders L are made of such proportions with respect to the width and length of the brood-chamber and the spaces at its sides and its height that two of the section-holders will properly fit the side spaces, as shown in Fig. 3.

As soon as the bees have taken full possession of the sections we take away the side packing on one side and remove the partition I. We then place the section-holders down at the side, one on top of the other, as indicated in Fig. 3, taking care to prevent leakage of the bees by pressing the holders up closely to the brood-chamber. The other two side section-holders may now be treated in the same manner, and placed down on the opposite side, as shown. When we find, from time to time, any of the sections filled and capped over, they may be replaced by others.

After the side section-holders are properly started and placed, the top section-holders, M M, are placed on the top of the brood-chamber, extending crosswise of the same, as indicated in Figs. 2, 3, and 4. These contain each five frames, $a'$, bearing each five sections, $u$. The frames are suspended from rabbeted ledges in the ends of the holder, and may be lifted out from the top.

To facilitate the removal or adjustment of these frames, and to enable the operator to examine or remove the sections, as occasion demands, a portion, $b'$, of the front of the holder is hinged so as to be let down and expose the interior.

Should the operator desire to work only the top section-holders, M, the partitions I I may be left in position, with the wings turned outward, all as shown in Fig. 4.

In case it may be desired to use in the side section-holders, L, sections of less depth, auxiliary grooves $d'$ (see Fig. 7) are provided in the ends of the holder, whereby the glass forming the front of the holder may be shifted, so as to fit closely to the front of such shallower sections. These glass plates are simply slipped into the grooves, and may be readily removed.

It will be observed that there is an open space always left between the walls of the hive and its interior parts, which insures a circulation of air from and through the ventilators $h\ i$, and the isolation of the sections and frames from the walls of the hive obviates all danger or trouble from melted comb should the hive be exposed to unusual heat at any time.

We claim for our hive that it has larger capacity in proportion to the space occupied, and the facility with which all its interior parts may be reached and handled greatly lessens the time consumed in making changes, and the dangers arising from exposing the bees and brood.

In some cases, where frames of less depth than those shown in Fig. 3 are employed, it is desirable to use a false bottom, so as not to leave too much room between the frames and the bottom of the hive. In such cases we prefer to employ a plate, $c'$, (shown in Fig. 6,) which is beveled at the front end, so as to form a slope down to the bee-entrance c, and is cut away at its rear end, so as to leave room for the trough o of the feeder H. This plate is made wide enough to floor the brood-chamber, and if it is desired to extend the frames to occupy the spaces at the sides of the same, other plain boards or pieces may be provided to form a false bottom therein also.

It will be seen that our hive is equally well adapted to the production of extracted or comb honey, and the pieces or extra parts J K, which are employed in conjunction with the frames, may be snugly stored away in the roof-cavity of the hive when not employed.

In Fig. 8 we have shown the method of keying the sections in the side section-holders, L. If these are made to fit snugly within the holders, so as to fill up all the space between the end pieces of the same, the bees will cement them in with wax, so that it will be difficult to remove the first one, so as to loosen or free the others. To obviate this we employ a key-block, N, which fits tightly between the last section and the end of the holder. Where narrower sections are employed a thicker key-block will be necessary, and these blocks may be removed in any well-known manner.

We claim—

1. A bee-hive provided with a feeder-holder, G, arranged to form the rear wall of the brood-chamber, and provided with a removable feeder, H, constructed substantially as set forth.

2. A bee-hive provided with a feeder-holder, G, and two removable partitions, I I, having hinged wings, the said partitions and wings being adapted and arranged to form the sides and roof of the brood-chamber, substantially as set forth.

3. A bee-hive provided with a ledge on the inner face of its front wall, a similar ledge on the feeder-holder G, and removable pieces J J K K, adapted to extend the said ledges, so as to provide supports for the frames m m throughout the entire width of the hive, substantially as set forth.

4. In a bee-hive provided with a feeder-holder, G, the combination therewith of the cleated strip t, constructed and arranged substantially as set forth.

5. The combination, in a bee-hive, of the fixed holder G, having a removable back, q, and the feeder H, all constructed and arranged substantially as set forth.

6. In a bee-hive, the combination of the section-holder L and the sections u u with the key-block N, all arranged to operate substantially as and for the purposes set forth.

7. A bee-hive provided with a top or cover, D, hinged to the front B, and a fixed portico, b, over the bee-entrance, adapted to protect said entrance, and to form a rest for the foot of a strut or support, g, which supports the cover when raised, substantially as set forth.

8. In a bee-hive, the false bottom c', adapted to floor the brood-chamber, and beveled at the front end to form a sloping entrance for the bees, and cut away at the other end to make room for the trough o of the feeder, substantially as set forth.

In witness whereof we have hereunto signed our names in the presence of two subscribing witnesses.

EDWARD P. WEYER.
HENRY C. WHITE.

Witnesses:
WILLIAM M. MONROE,
JOHN H. WOODEN.